United States Patent Office 2,791,088
Patented May 7, 1957

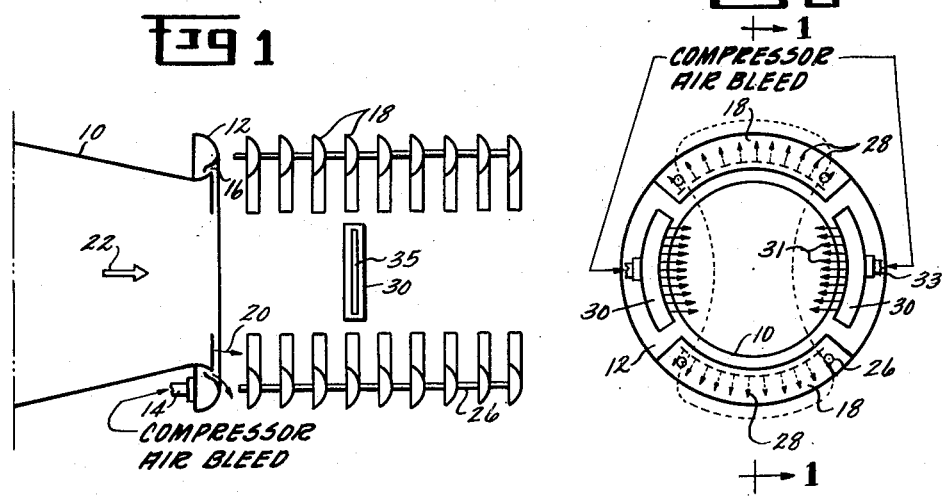

2,791,088

DEVICE FOR THRUST SPOILING AND THRUST REVERSAL

Gadicherla V. R. Rao, Cincinnati, Ohio, assignor to General Electric Company, a corporation of New York Application March 2, 1955, Serial No. 491,649

4 Claims. (Cl. 60—35.54)

The present invention relates to jet engines and in particular to a device for reversing the thrust of a jet engine.

It is well known that large, aerodynamically clean, jet airplanes need extra long runways for landing. Since this type of aircraft lands at high speeds, wheel brakes and aerodynamic brakes have not been able to make the necessary reduction of the landing run of such an aircraft. It is therefore an object of this invention to provide a thrust reverser for a turbo-machine capable of materially reducing the landing run of an aircraft.

It also has become materially important to maintain positive control of engine thrust during the landing approach and touchdown of jet engine aircraft. This is especially true during a wave-off when the pilot's flight control problem can be seriously aggravated. Rapid change over from reverse thrust operation to the normal operation and vice-versa in the shortest period of time becomes an important criteria for any thrust reverser. It is therefore another object of this invention to provide a thrust reversing device for a turbomachine capable of controlling the engine thrust of an aircraft during landing approach and landing run.

It is still another object of this invention to provide a thrust reversing device for reversing the direction of hot gases from an exhaust nozzle of a turbomachine which permits the engine throttle to be maintained at a high thrust setting while the reversing device is used to limit the net forward thrust to any desired level during approaches and landing, thereby providing the pilot with full thrust available almost immediately for a wave-off by retracting the thrust reversing device.

It is known that attempts have been made to reverse the thrust of a jet engine by providing guide vanes at the circumference of the exhaust pipe through which the exhaust gases from the exhaust nozzle are forced to pass by air being ejected through a horizontal bar extending across the exhaust nozzle, or by ejecting air through openings in the side of the exhaust nozzle and forcing the exhaust gases out through the guide vanes. However, the former method leads to loss in thrust in normal operation of the engine, and with the latter it is difficult to produce sufficient amount of reverse thrust. It is therefore a further object of this invention to provide lateral air injection means to force the hot gases of a jet engine out through guide vanes which are spaced at the circumference of the path of the hot gases, the air injection means being positioned aft of the exhaust nozzle instead of in the exhaust nozzle.

Another further object of this invention is to provide means for diverting a portion of the gas stream into a plurality of guide vanes positioned longitudinally of the gas stream and aft of the exhaust nozzle, in addition to lateral air injection means so as to cause the entire quantity of exhaust gases to be deflected through the vanes thereby resulting in larger reverse thrust.

These and other objetcs will become more apparent when read in the light of the accompanying specifications and drawings wherein similar parts will be designated by the same number and wherein the parts will be designated by specific names but are intended to be as generic in their applications as the prior art will permit wherein:

Figure 1 is a cross-sectional view taken on lines 1—1 of Figure 2 showing boundary layer control means in addition to air being injected from the side, Figure 2 is an end view of Figure 1 showing the direction of the air from the boundary layer control means and the direction of the air from the injection means from the side of the engine, Figure 3 is a view showing air injection means in addition to boundary layer control means plus air being injected from the side, Figure 4 is a cross-sectional view taken on lines 4—4 of Figure 3 showing the direction of the entrance of the air from the air injection means which is in a near tangential direction to the exhaust jet.

In order to reverse the flow of exhaust gases from the exhaust nozzle of a turbomachine a plurality of guide vanes are provided into which the hot gases are forced and once induced into the guide vanes, the stream of hot gases will continue to flow through the guide vanes. It is noted that the guide vanes are curved in such a manner to turn the hot gases in a reverse direction.

Referring to Figures 1 and 2, boundary layer control means plus lateral air injection means are shown. The numeral 10 generally represents an exhaust nozzle or tailpipe of a jet engine (not shown). The boundary layer control means is shown at the exhaust nozzle and is formed by an annular chamber 12 for receiving air bled from the compressor through the conduit 14. In addition, slots are shown at 16 in the chamber 12, which slots are directed in an outward direction. The direction of the slots 16 is important since the air bled from the compressor is shown at 20 being injected into the first stage of guide vanes 18 so as to induce the flow of hot gases, as shown by the arrow 22, from the exhaust nozzle into the remaining guide vanes.

The guide vanes 18 are arcuate in cross-section as shown in Figure 1, and they are positioned in opposite quadrants as best seen in Figure 2. The guide vanes 18 are mounted on rods 26 and may or may not be retractable. Also, the device may be used with variable area exhaust nozzles. Any mechanical linkage arrangement, well known in the art, can be used to retract the guide vanes if so desired, which linkage forms no part of this invention and is therefore not shown.

In order to further induce the hot gases from the exhaust nozzle to be directed into the guide vanes 18, lateral air injection means is disposed in the spaces between the vane quadrants. The lateral air injection means is formed by oppositely positioned manifold structures 30 which provide a box-like structure for receiving bleed air from the compressor as shown at 33. The compressor air is injected into the jet stream through slots 35 in the manifold structure.

Since the manifold structures 30 are outside the periphery of the nozzle, no loss in thrust will be incurred by the engine under normal operation. By positioning the air injection means at the side of the exhaust stream downstream from the exhaust nozzle, so as to cooperate with the boundary layer control means, the hot gases are sufficiently turned through the guide vanes to provide thrust reversal. In this modification the air injected from the side as shown at 31 in Figure 2 is injected substantially perpendicular to the jet stream in a slightly forward direction. The boundary layer control means will start inducing flow through the first stages of guide vanes and the air injected from the side will compress the gas stream as shown by dotted line in Figure 2 so as to force the entire hot gases through the guide vanes to provide the necessary thrust reversal.

Referring to Figures 3 and 4 another modification is shown in which tangential air injection means plus boundary layer control means and lateral air injection means cooperate to deflect the exhaust gas stream. The numeral 10 represents an exhaust nozzle and the hot gases are shown passing downstream at 22. In this modification, tangential air injection means is shown in which air is directed through longitudinal slots 37 provided in the baffle or the like 32 in a direction near tangential to the exhaust jet as shown at 34. It is noted that there are two such baffles positioned on either side of the gas stream and that the air bleed into each of the baffles is injected in opposite directions as shown in Figure 4. The air injected through the slots 37 of baffles 32 forms an obstruction along the length of the jet stream which tends to induce flow radially outwardly into the guide vanes. Air injected in this manner in addition to lateral air injected from the side as shown at 31 plus the boundary layer control means at 12, 14 and 16 cooperate to produce the required thrust reversal.

The above description of the invention was made merely to illustrate the invention and was not intended to be a limitation of the invention. Many modifications and improvements can be made to the above arrangements, all of which are intended to be regarded as equivalents and be included within the spirit and scope of this invention.

What I claim as new and desire to secure by Letters Patent of the United States is:

1. In combination with an exhaust nozzle of a turbomachine, a thrust reverser comprising: a plurality of stages of guide vanes for deflecting the exhaust gas stream in a reverse direction, said guide vanes being positioned closely adjacent to and downstream from the exhaust nozzle; boundary layer control means mounted on said nozzle for injecting into the first stage of guide vanes thereby inducing part of the exhaust gases to flow through the guide vanes; lateral air injection means positioned downstream from and outside the periphery of said exhaust nozzle adjacent the guide vanes, said last named means including manifold structures adapted to provide air directed transversely of the gas stream in order to squeeze the gas stream into the guide vanes thereby cooperating with the boundary layer control means to induce the necessary flow of hot gases through the guide vanes for thrust reversal.

2. In combination with an exhaust nozzle for a turbomachine, a thrust reverser comprising: a plurality of guide vanes for reversing the gas stream, said vanes being positioned in opposite quadrants around the exhaust jet and extending downstream of the exhaust nozzle; air injection means including baffles positioned downstream of the exhaust nozzle, slots in said baffles adapted for directing air in a direction near tangential to the exhaust jet; and lateral air injection means including manifolds positioned adjacent said baffles having slots therein for directing air transversely of the gas stream, the lateral air injection means cooperating with the first named air injection means for squeezing the gas stream into the guide vanes, thereby producing reverse thrust.

3. A thrust reverse device for a turbomachine comprising: an exhaust nozzle provided with a plurality of guide vanes positioned downstream thereof; boundary layer control means mounted on the exhaust nozzle for inducing flow of hot gases into said guide vanes; air injection means positioned downstream of the exhaust nozzle adjacent the guide vanes for directing air into the exhaust jet in a near tangential direction for inducing the flow of hot gases into said guide vanes; lateral air injection means positioned adjacent the first named air injection means for squeezing the hot gases and cooperating with said boundary layer control means and said first named air injection means to deflect the gases into the guide vanes to produce thrust reversal.

4. In combination with an exhaust nozzle of a turbomachine, a thrust reverser comprising: a plurality of stages of guide vanes for deflecting the exhaust gas stream in a reverse direction, said guide vanes being positioned closely adjacent to and downstream from the exhaust nozzle; boundary layer control means including an annular chamber surrounding said nozzle and openings therein for injecting air into the first stage of guide vanes thereby inducing part of the exhaust gases to flow through the guide vanes; air injection means including baffles positioned downstream of the exhaust nozzle, longitudinal slots in said baffles adapted for directing air in a direction near tangential to the exhaust jet; lateral air injection means positioned downstream from and outside the periphery of said exhaust nozzle adjacent the air injection means, said lateral air injection means including manifold structures adapted to provide air directed transversely of the gas stream, said lateral air injection means cooperating with said boundary layer control means and said air injection means to deflect the exhaust gases into the guide vanes to produce reverse thrust.

References Cited in the file of this patent

UNITED STATES PATENTS

| | | |
|---|---|---|
| 2,491,610 | Goddard | Dec. 20, 1949 |

FOREIGN PATENTS

| | | |
|---|---|---|
| 1,020,287 | France | Nov. 12, 1952 |
| 1,030,483 | France | Mar. 11, 1953 |